May 29, 1956 K. FRANCK ET AL 2,748,263
DIRECT LIGHTING LUMINAIRES
Filed Aug. 11, 1952 3 Sheets-Sheet 1
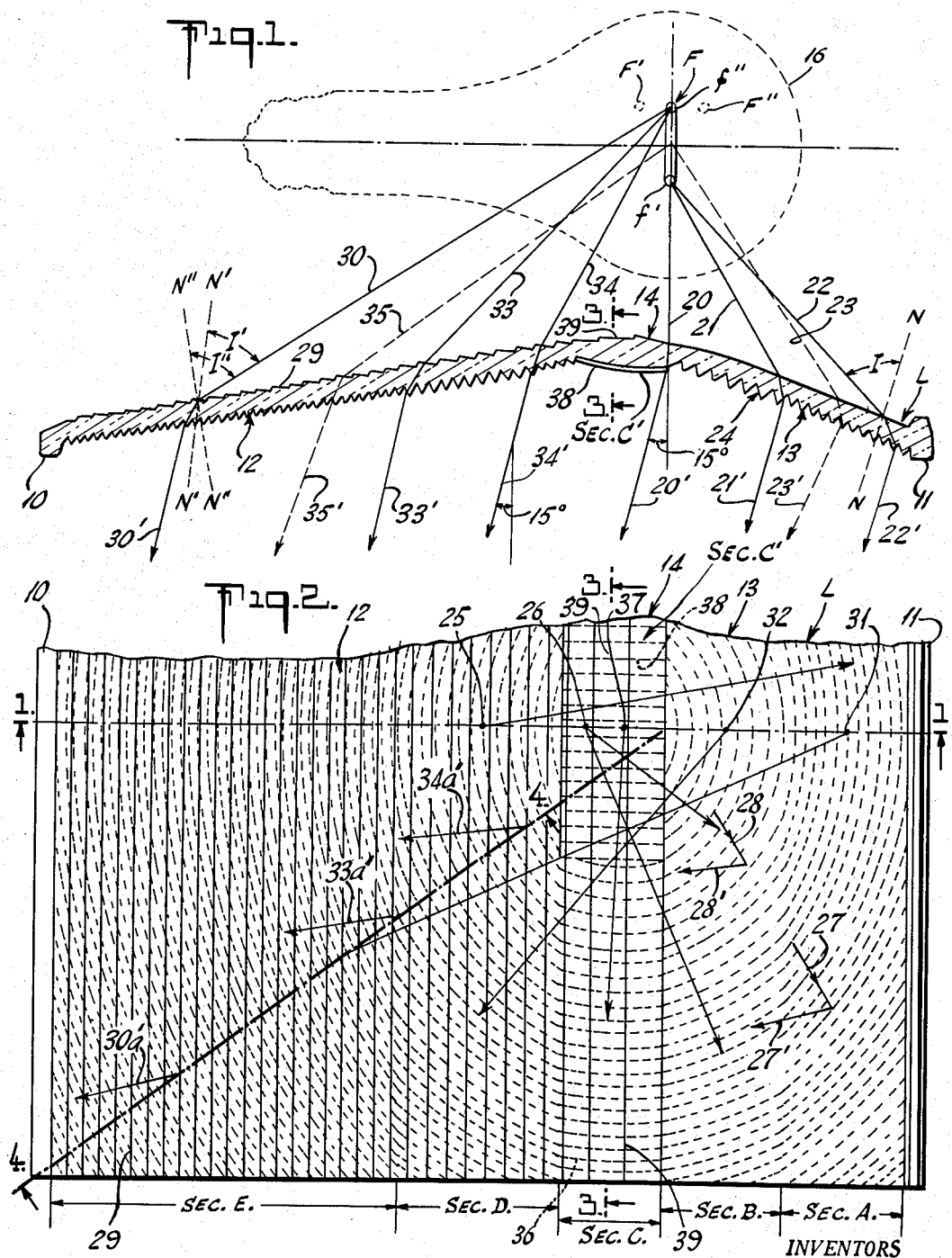
INVENTORS
KURT FRANCK &
ROBERT G. McPHAIL
BY
John M. Cole
ATTORNEY

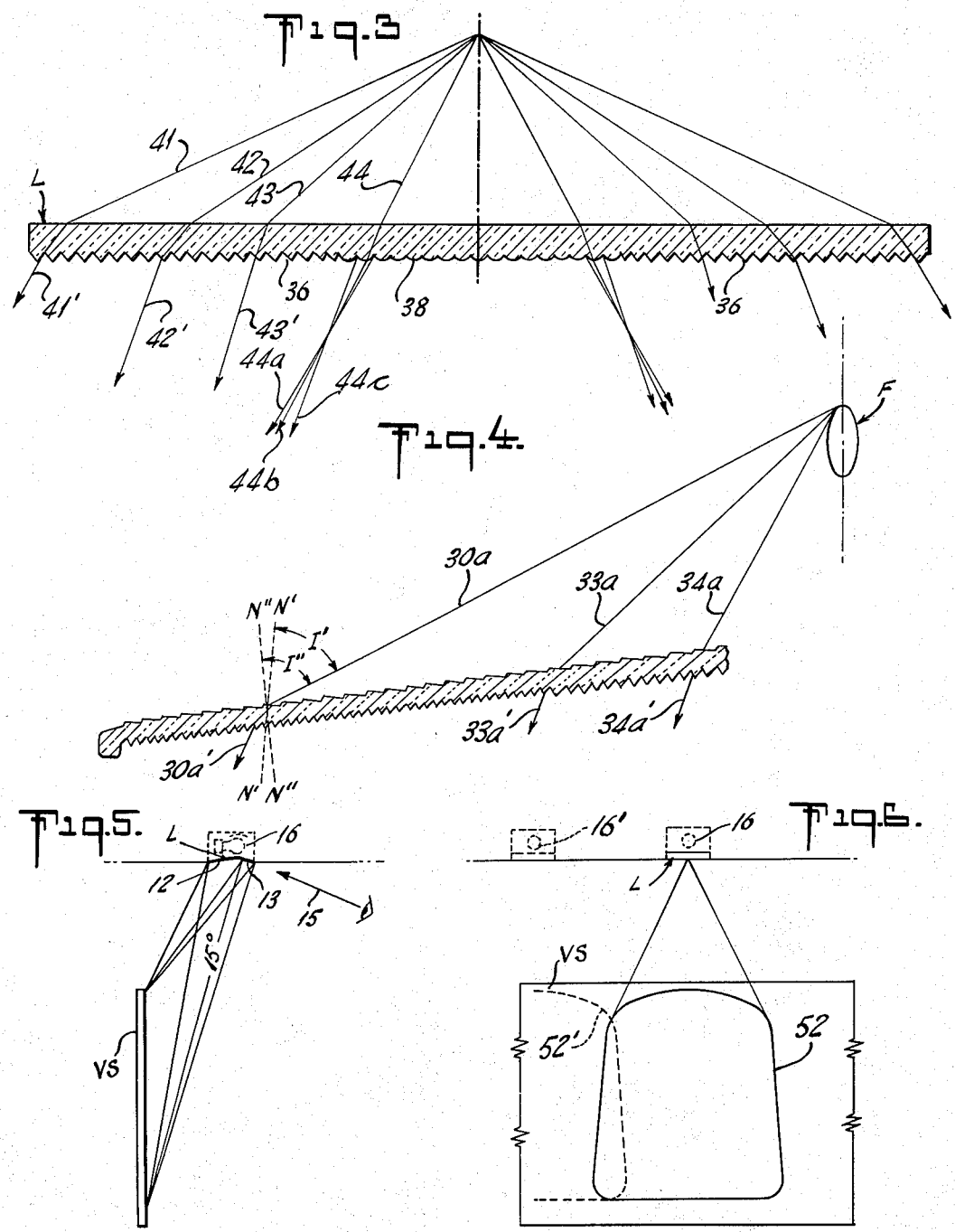

May 29, 1956 K. FRANCK ET AL 2,748,263
DIRECT LIGHTING LUMINAIRES
Filed Aug. 11, 1952 3 Sheets-Sheet 3
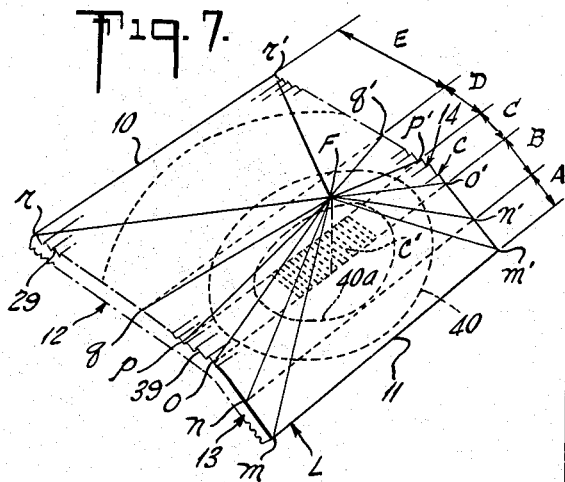
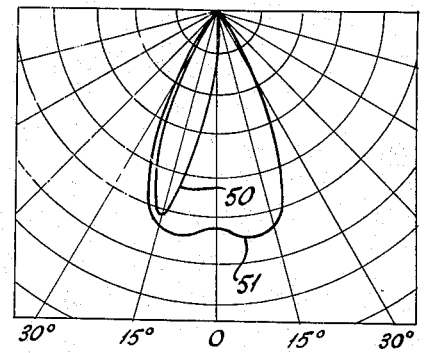
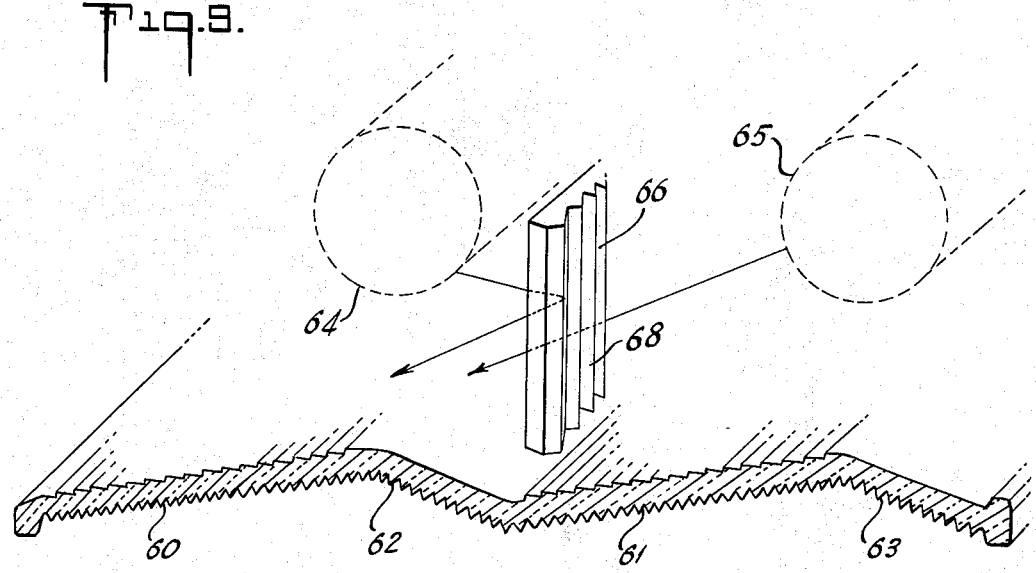
INVENTORS
KURT FRANCK &
ROBERT G. McPHAIL
BY
ATTORNEY United States Patent Office 2,748,263
Patented May 29, 1956

2,748,263

DIRECT LIGHTING LUMINAIRES

Kurt Franck and Robert G. McPhail, Newark, Ohio, assignors to Holophane Company, Inc., New York, N. Y., a corporation of Delaware Application August 11, 1952, Serial No. 303,652

14 Claims. (Cl. 240—106)

The present invention is directed toward direct lighting luminaires for producing downwardly oblique light beams.

It has heretofore been customary to light vertical surfaces, such as, control boards, blackboards, switchboards, wall-mounted pictures, and the like, by direct lighting units, mounted above and in front of the surface to be lighted and employing flat, horizontal lenses or refractors below the light sources and reflectors and to have the sources offset from the vertical through the lens focus to produce an oblique beam. This ordinarily involves a sacrifice of light output, as light losses are to be expected when the lamp is offset from the center of a lens designed for an axially located source. The flat lens also presents a substantial projected area of luminosity if mounted low enough to be in the field of view and back shots of light tend to build up brightness contrasts.

According to the present invention, the lens or refracting plate is arched or downwardly concave, adapted to be recessed above the ceiling line and carries an optical system especially suited for producing a downwardly oblique light beam.

The lens plate used has an asymmetric anticlinal profile, narrower toward the front than the rear. The front portion is steeper and self screening and has prisms which direct the light falling on it across the vertical, or rearwardly, while the rear, less steep portion, has opposed prisms which transmit the light downwardly and rearwardly at the same angle of inclination as the light from the front portion.

Where the light source is elongated, it is disposed above the ridge connecting the two sloping portions and the prisms are longitudinal. Where, however, the lens is for use with a concentrated source, incandescent lamp, the prisms instead of being in concentric circles as customarily employed, are in the form of quasi-elliptical loops about the light center. Instead, however, of making the prisms alike in all azimuths, the present invention contemplates varying the refracting power of the prisms in different azimuths. It has been found that the prism arrangement shown herein provides a relatively narrow spread of light in planes parallel to the vertical surface.

In order to secure sharp cut-off of light at the top and bottom of the illuminated area of the vertical surface intercepting the light output, the prisms of the lens are preferably designed to deviate the rays from the extreme portions of the filamentary source the optimum amount and, as a consequence, confine the rays from the intermediate portions to angles nearer the axis of the emitted beam.

Other and further objects of the invention will appear as the description proceeds.

The accompanying drawings show, for purposes of illustrating the present invention, an embodiment in which the invention may take form, together with a modified arrangement of lamps and refractor, it being understood that the drawings are illustrative of the invention rather than limiting the same.

In the accompanying drawings:

Figure 1 is a cross-sectional view on the line 1—1 of Figure 2 and at right angles to the vertical surface to be illuminated;

Figure 2 is a top plan view of the lens plate;

Figure 3 is a transverse sectional view on the line 3—3 of Figures 1 and 2;

Figure 4 is a section in the line 4—4 of Figure 2;

Figure 5 is a diagrammatic view at right angles to the wall, showing the relation of the luminaire and the wall;

Figure 6 is a diagrammatic front view showing the wall illumination area;

Figure 7 is a perspective view of the lens and taken from the top;

Figure 8 is a diagram illustrating the photometric curves of the luminaire; and

Figure 9 is a cross-section of a multiple lamp luminaire designed for tubular lamps.

The luminaire shown in Figures 1-7 inclusive, is one designed primarily for use with an incandescent lamp mounted preferably with the axis horizontal and arranged to be shifted transversely of the lens to effect adjustment of the beam throw. When used for a single incandescent lamp the lens may be made approximately 11" square to fit into recessed lamp boxes of conventional size. Such a square lens is shown in the drawings. The lens L has parallel rear and front edges, 10 and 11 respectively, which are adapted to be supported at a common level. The general front to rear profile of the lens, includes wide upwardly sloping rear portion 12 and a relatively narrow upwardly sloping front portion 13. The rear portion is about twice the width of the front portion and the portions form, what may be conveniently termed, a ridge 14. This profile may conveniently be described as asymmetric anticlinal profile, narrower toward the front than the rear.

When the lens of such profile is viewed from below and the front, as indicated at 15 Figure 5, the front portion of the lens plate is out of the line of sight and only the rear portion is in the line of sight. Thus a smaller projected area of the lens is then in the line of sight than were a flat lens of equal total area employed.

A horizontal incandescent lamp 16 is mounted above the lens plate, as indicated in the drawings, with the lamp filament F above the ridge portion of the lens. The front portion 13 of the lens is designed to accept light rays such as 20, 21, 22 from the lower part of $f'$ of the filament and emit these rays as indicated at 20', 21', 22' parallel with one another and at a suitable angle to the nadir. With the lamp located at the optimum position the vertical angle of the emitted rays is preferably 15°. Direct rays from higher portions of the filament F will be deviated into higher angles from the nadir, as indicated for example by the ray 23, 23', originating midway between the top and bottom of the filament.

It will be noted that the light falling on the upper front surface of the lens plate has relatively high angle of incidence I to the normal N—N, so that a greater deviation takes place at the upper surface than would take place on a flat lens smooth on top. Hence less deviation is required by the prisms on the lower surface, generally indicated at 24, to secure the desired overall deviation for the front component of light to be sent across the vertical axis.

The prisms 24 are centered about two points 25 and 26 toward the rear of the lens; those in the front section A being centered at 25 and those in the next section B being centered at 26. These prisms deviate rays 20', 21', 22' within the plane of Figure 1, while rays such as 27 and 28, Figure 2, are turned out of the radial plane as indicated at 27', 28'.

The upper rear surface of the lens plate has a series of parallel ribs which make angles of the order of 14° with the general profile in the plane of Figure 1, and lesser angles in the diagonal plane of Figure 4. These decrease the angles of incidence by corresponding amounts, as indicated by the angles I' and I" to the normals N' and N" in these figures for rays 30, 30a. The rays in the refracting medium are therefore at higher angles than if no elevating prisms were used. The decrease in angle of incidence (particularly at the regions which would otherwise have very high angles of incidence) makes it possible for the lens plate to accept much more flux than a smooth plate would accept. For example, reduction of incidence angle from 70° to 55° increases transmission from 83% to 93%.

The lower surface of the rear portion of the lens plate is covered by two systems of concentric prisms centered about points 31 and 32 to the front of the lamp filament. The prisms in rearward section E are centered at 31 while those in section D are centered at 32. These prisms act on rays, such as, 30a, 30a' to emit the rays at steep angles. The ray 30a' is at a higher angle and out of the plane 4—4, as indicated by the arrow 30a', Figure 2.

Other direct rays such as, 33, 33a, 34, 34a are transmitted as indicated at 33', 33a', 34', 34a'.

It will be noted that rays 30, 33, 34, 33a, 34a have been drawn from the top F' of the filament. Rays from lower portions of the filament falling on the rear of the lens plate will be deviated at higher angles, as indicated by rays 35, 35', Figure 1. These rays do not therefore augment the fringe area at the bottom of the beam.

Between sections B and D, in the region of the ridge 14 of the lens plate, the plate has a section C covered by concentric prisms 36 centered at 37 and a convex section C' provided with diffusing flutes 38. The upper surface opposite section C and C' has a number of relatively wide, shallow prisms 39.

The width of the prisms in sections A, B, C, D and E varies in the different sections so as to form continuous quasi-elliptical loops, such as indicated in Figure 7 at 40, 40a, generally centered about the lamp filament. The "ellipse" is symmetrical on opposite sides of plane 1—1, but is asymmetric about the plane 3—3.

The refracting power of the prisms 36, Fig. 3, is such as to concentrate the rays 41, 42, 43 into a moderately divergent beam as indicated at 41', 42' and 43'. Rays such as 44 passing through the flutes 38 are spread as indicated at 44a, 44b and 44c, the highest angled light from the flute ray 44a being substantially parallel with the ray 41' and the spread of the rays 44a—44c being approximately that of the rays 41'—43' so that the light is well mixed.

Referring to Figure 7, it will be seen that the refracting plate accepts an oblique square pyramid of direct and reflected light, as represented by the lines from F to m, m', r and r', and that this is made up of smaller pyramids of light; namely, m—m'—n'—nF; n—n'—o'—oF; o—o'—p'—pF; p—p'—q'—qF; q—q'—r'—rF, all arranged in a manner to build up a projected beam concentrated at 15° to the nadir and of relatively narrow lateral spread.

The photometric curve 50, Figure 8 shows the light distribution in the plane of Figure 1 and the curve 51 shows the lateral distribution in the beam. The light falls on the wall, control board, or other vertical surface VS, Figures 5 and 6, as indicated, and produces an illuminated spot shaped about as shown at 52 when the lamp is at the central position. The lateral spread of the light at the top of the beam is angularly wider than at the bottom so that a spot wide at the top is obtained. When units are mounted at reasonable spacings as indicated by the dotted line showings at the left of Fig. 6, the spots overlap from top to bottom. Shifting the lamp will alter the size and position of the spot. As only a small area of lens is in the light of sight 15 and the portion being seen is sending light rearwardly, the brightness of its rear portion is low.

Where the luminaire is to employ a single fluorescent lamp, the profile of Figure 1 would be continued for the length of the luminaire. The rearward beam throw would approximate the 15° angle.

Where, however, more output is desired from tubular sources than the single tubular lamp provides, a lens plate of the same width to fit the lamp boxes may have two upwardly and forwardly sloping portions 60, 61 and two upwardly and rearwardly sloping portions 62, 63 with lamps 64 and 65 above each ridge. The upper and lower prism systems will follow the same general layout as above discussed, all prisms being parallel. To shield portion 62 against light from lamp 65 and portion 61 against direct light from lamp 64, a screen 66 may be interposed. This screen 66 may have vertical totally reflecting prisms 68 which return light from lamp 64 and transmit light from lamp 65, as indicated.

Since it is obvious that the invention may be embodied in other forms and constructions within the scope of the claims, we wish it to be understood that the particular forms shown are but a few of these forms, and various modifications and changes being possible, we do not otherwise limit ourselves in any way with respect thereto.

What is claimed is:

1. A lens for producing downwardly oblique light beams for the lighting of a rearwardly disposed vertical surface below the level of the lens, said lens having an asymmetric anticlinal profile steeper and narrower toward the front than the rear, the opposed surfaces of the front portion constituting prisms of variant refracting power to deviate light received from a superposed source near the vertical plane through the top of the anticline across the nadir and into uniform relatively steep angles from the nadir, the opposed surfaces of the rear portion constituting prisms of variant refracting power to lower the rearward light from said source into directions substantially parallel with the light from the front portion.

2. A lens as claimed in claim 1, wherein the upper front of the lens is smooth and the upper rear portion has regressed prism surfaces which reduce the angles of incidence of direct light.

3. A lens as claimed in claim 1, wherein the lower prisms on the rear portion of the lens are forwardly concave and arcuate.

4. A lens as claimed in claim 1, wherein the lower prisms on the front portion of the lens are rearwardly concave and arcuate.

5. A lens as claimed in claim 1, wherein the lower prisms on the rear portion of the lens are forwardly concave and arcuate and the lower prisms on the front portion of the lens are rearwardly concave and arcuate.

6. A lens as claimed in claim 1, wherein certain of the prisms are of quasi-elliptical shape centered about a point in said vertical plane.

7. A lens as claimed in claim 1, wherein the upper front portion of the lens is smooth and the upper rear portion has regressed prism surfaces which reduce the angle of incidence of direct light and wherein certain of the prisms on the lower surface are of quasi-elliptical shape centered about a point in said vertical plane.

8. A lens plate of rectangular configuration with the front and rear edges normally in the same horizontal plane and sloping upwardly to a ridge nearer the front than the rear, the upper surface of the lens to the rear of the ridge having lengthwise thereof prisms which reduce the angle of incidence of light falling thereon and to the front of the ridge being smooth, the lower surface of the plate being provided with quasi-elliptical prisms centered about the mid-point of the ridge.

9. In combination, a light source, light refracting and transmitting means below the level of the source and having at the rear a downwardly and rearwardly sloping component and at the front a downwardly and forwardly sloping component with the ridge under the source, the front and rear edges being in a common horizontal plane, so that the front portion is screened against observation at angles of observation below the horizontal less than its slope angle and in said range of angles the rear portion is partially screened against observation, the front component having refracting prisms which deviate light from the source rearwardly of the vertical, the rear component having refracting prisms which deviate light from the source rearwardly at substantially the same line of slope as the rays from the front component.

10. The combination of claim 9, wherein the source is a point source and the prisms in the front component are arcs about centers to the rear of the source.

11. The combination of claim 9, wherein the source is a point source and the prisms on the lower surface of the rear component are arcs about centers to the front of the source.

12. The combination of claim 9, wherein the source is a point source and the prisms in the front component are arcs about centers to the rear of the source and wherein the prisms on the lower surface of the rear component are arcs about centers to the front of the source.

13. A substantially square lens plate whose area is made up of a narrow median section extending across the plate nearer one edge than the opposite edge, two relatively narrow sections on one side of the median section and two relatively wide sections on the other side of the median section, the plate having a system of light concentrating prisms occupying the median section and arcuate about a point located substantially central thereof, and four systems of light concentrating prisms one in each section, those in each of the wide and narrow sections being concentric about a common point, different than that of any of the other points and all five points being in a line extending transversely of the sections, the prisms forming continuous quasi-elliptical loops, each prism being of uniform refracting power along its length throughout the band it traverses, the prisms in the narrower sections having greater refracting power for rays from a substantially point source above the center of the median section than the prisms in the wider sections for rays from said source.

14. A luminaire comprising a concentrated filamentary light source, a rectangular lens plate below the source and with its center offset rearwardly from the vertical through the source and its transverse front and rear center line under the source so that it intercepts a pyramid of direct light symmetric longitudinally and asymmetric transversely, the plate having front and rear portions which slope down from a ridge substantially under the source, the upper rear surface of the lens plate having longitudinally extending prisms which reduce the angles of incidence of direct light from the source, the upper front surface being smooth, the lower surface being composed of a median longitudinal band along the ridge and front and rear bands, each band being covered by a pattern of concentric light concentrating prisms centered in the transverse center line and of uniform refracting power throughout their length, the prisms of each band merging with those of the adjacent band or bands to form continuous quasi-elliptical loops.

References Cited in the file of this patent

UNITED STATES PATENTS

| D. 141,064 | Zimmerman | May 1, 1945 |
| 1,350,295 | Champeau | Aug. 24, 1920 |
| 1,955,599 | Lamblin-Parent | Apr. 17, 1934 |
| 2,495,320 | Franck | Jan. 24, 1950 |
| 2,564,373 | Potter | Aug. 14, 1951 |

FOREIGN PATENTS

| 616,465 | Great Britain | Jan. 21, 1949 |